United States Patent
Jordan et al.

(10) Patent No.: US 7,937,556 B2
(45) Date of Patent: May 3, 2011

(54) MINIMIZING TLB COMPARISON SIZE

(75) Inventors: Paul J. Jordan, Austin, TX (US);
Manish K. Shah, Austin, TX (US);
Gregory F. Grohoski, Bee Cave, TX (US)

(73) Assignee: Oracle America, Inc., Redwood City, CA (US)

( * ) Notice: Subject to any disclaimer, the term of this patent is extended or adjusted under 35 U.S.C. 154(b) by 570 days.

(21) Appl. No.: 12/112,150

(22) Filed: Apr. 30, 2008

(65) Prior Publication Data

US 2009/0327646 A1    Dec. 31, 2009

(51) Int. Cl.
*G06F 12/10*    (2006.01)
(52) U.S. Cl. .......................................... 711/206; 711/207
(58) Field of Classification Search ........................ None
See application file for complete search history.

(56) References Cited

U.S. PATENT DOCUMENTS

| 6,510,508 | B1 | 1/2003 | Zuraski, Jr. et al. |
| 7,293,157 | B1 | 11/2007 | Parikh et al. |
| 2006/0259734 | A1* | 11/2006 | Sheu et al. .................... 711/203 |
| 2007/0061548 | A1 | 3/2007 | Jordan et al. |
| 2007/0283125 | A1* | 12/2007 | Manczak et al. .............. 711/207 |

* cited by examiner

*Primary Examiner* — Than Nguyen
(74) *Attorney, Agent, or Firm* — Lawrence J. Merkel; Meyertons, Hood, Kivlin, Kowert & Goetzel, P.C.

(57) ABSTRACT

In one embodiment, a system comprises one or more registers configured to store a plurality of values that identify a virtual address space (collectively a tag), a translation lookaside buffer (TLB), and a control unit coupled to the TLB and the one or more registers. The control unit is configured to detect whether or not the tag has changed and in response to a change in the tag, map the changed tag to an identifier having fewer bits than the total number of bits in the tag, and provide the current identifier to the TLB. The TLB is configured to detect a hit/miss in response to the identifier. A similar method is also contemplated.

20 Claims, 6 Drawing Sheets

| Fetch (F) | T0 | T3 | T6 | T2 | T7 | T5 | T1 | T4 |
|---|---|---|---|---|---|---|---|---|
| Cache (C) |  | T0 | T3 | T6 | T2 | T7 | T5 | T1 |
| Pick (P) |  |  | T0 | T3 | T6 | T2 | T7 | T5 |
| Decode (D) |  |  |  | T0 | T3 | T6 | T2 | T7 |
| Execute (E) |  |  |  |  | T0 | T3 | T6 | T2 |
| Memory (M) |  |  |  |  |  | T0 | T3 | T6 |
| Bypass (B) |  |  |  |  |  |  | T0 | T3 |
| Writeback (W) |  |  |  |  |  |  |  | T0 |
| Execution cycle | 0 | 1 | 2 | 3 | 4 | 5 | 6 | 7 |

Fig. 3

MINIMIZING TLB COMPARISON SIZE

BACKGROUND

1. Field of the Invention

This invention is related to translation lookaside buffers (TLBs) and minimizing the size of TLB comparisons.

2. Description of the Related Art

Processors and computer systems that include the processors typically implement a virtual memory system, in which most software executing on the processors and accessing memory do so using virtual (or effective) addresses. These addresses are translated through the virtual memory system to physical addresses, which are used to access memory.

Performing a translation frequently requires several accesses to page tables in memory. Accordingly, most processors implement a cache for a subset of the translations from the page tables, referred to as a translation lookaside buffer (TLB). The TLB caches the results of the translation process, which includes an identification of the virtual address and the corresponding physical address. The data cached in the TLB and used to translate a given range of virtual addresses (e.g., a page) is referred to as a "translation" for the range/page.

To distinguish between translations, the TLB can contain one or more comparison fields. One such field is commonly referred to as a "virtual page number"; collectively, the comparison fields are referred to as a "tag." As the number of address bits in the virtual address space or tag space increases, the width of the comparison increases as well, which increases the latency of the TLB.

SUMMARY

In one embodiment, a system comprises one or more registers configured to store a plurality of values (collectively a tag) that identify a virtual address space, a translation lookaside buffer (TLB), and a control unit coupled to the TLB and the one or more registers. The control unit is configured to detect whether or not the tag has changed and in response to a change in the tag, map the changed tag to an identifier having fewer bits than the total number of bits in the tag, and provide the current identifier to the TLB. The TLB is configured to detect a hit/miss in response to the identifier. A similar method is also contemplated.

In another embodiment, a processor comprises one or more registers configured to store a tag that identifies a virtual address space and a translation lookaside buffer (TLB) unit that is coupled to the one or more registers. The TLB is configured to detect a change in the tag and map the changed tag to a current identifier having fewer bits than a total number of bits in the tag. The TLB unit comprises a TLB that is configured to map the current identifier and a virtual address input to a corresponding physical address.

BRIEF DESCRIPTION OF THE DRAWINGS

The following detailed description makes reference to the accompanying drawings, which are now briefly described.

FIG. 3 is a pipeline diagram illustrating one embodiment of a pipeline that may be implemented by the core shown in FIG. 1.

Figure 1:
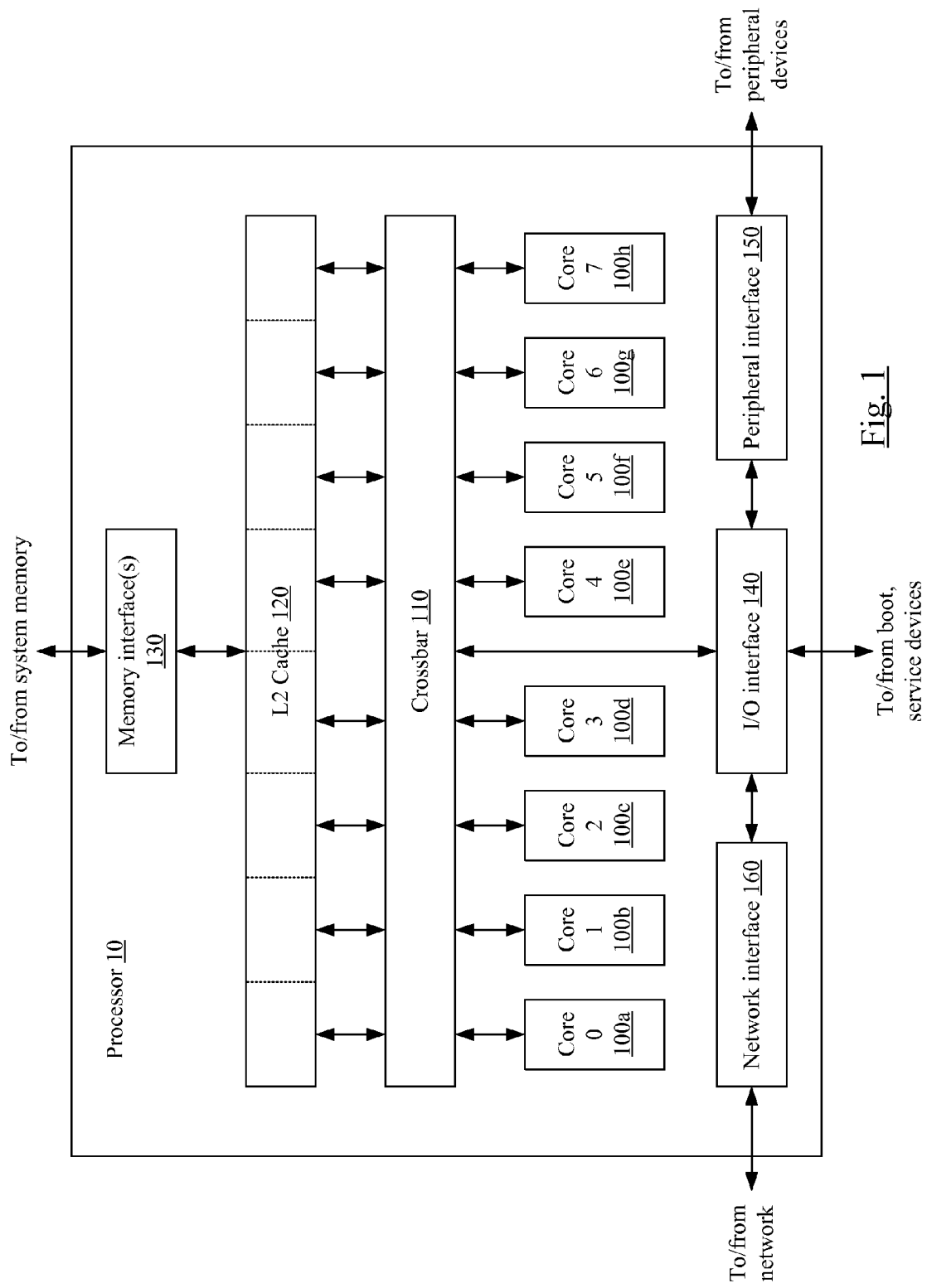
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF EMBODIMENTS

Overview

Figure 2:
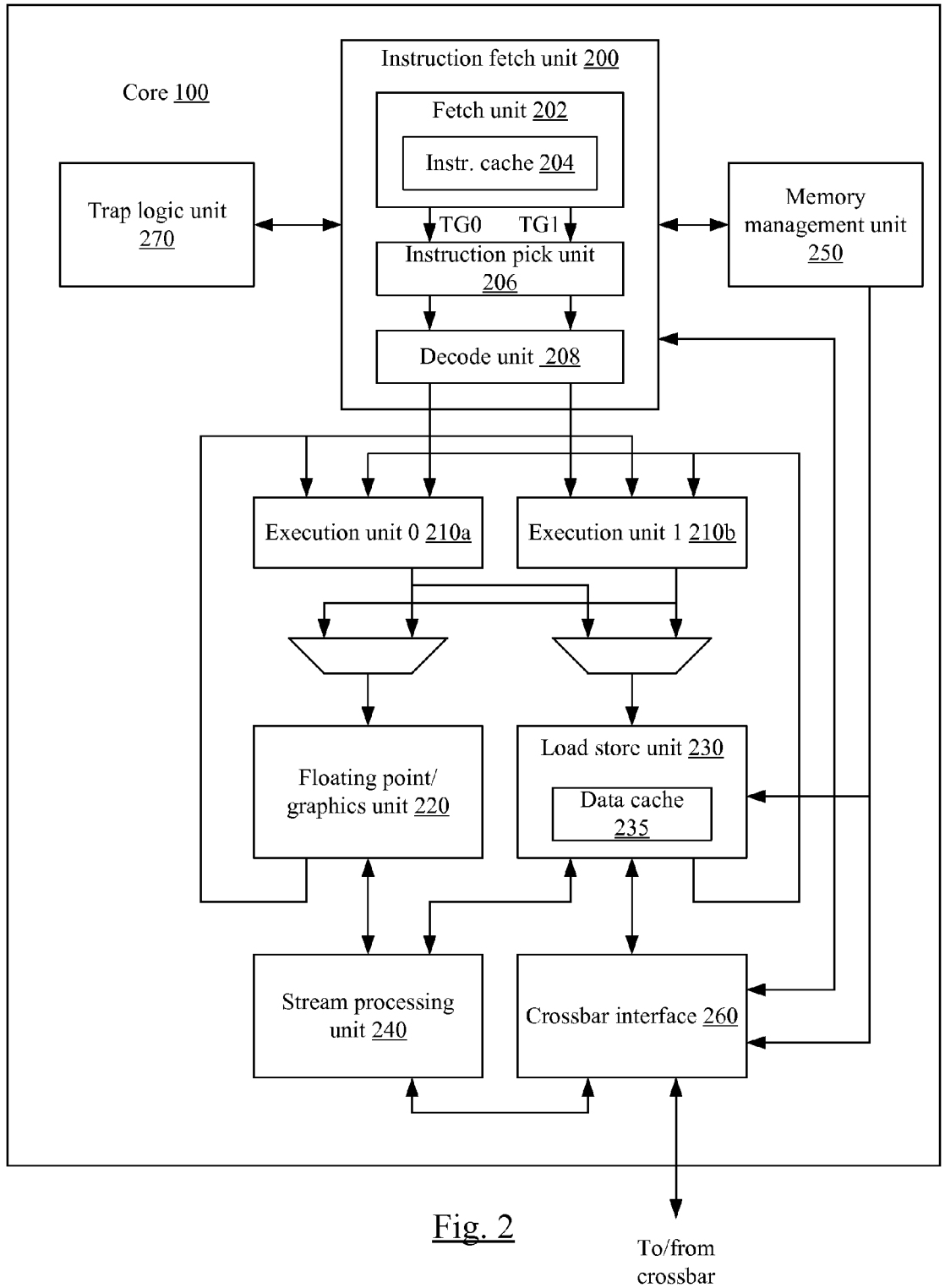
FIG. 2 is a block diagram of one embodiment of a core shown in FIG. 1.

FIGS. 1-3 present an overview of a multithreaded processor 10 that may implement the demap operations as described in more detail below. In other embodiments, the processor may implement other multithreaded configurations, as desired.

A block diagram illustrating one embodiment of a multithreaded processor 10 is shown in FIG. 1. In the illustrated embodiment, processor 10 includes a plurality of processor cores 100*a-h*, which are also designated "Core 0" though "Core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150, and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100.

Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FBDIMM), Double Data Rate or Double Data Rate 2 Synchronous Dynamic Random Access Memory (DDR/DDR2 SDRAM), or Rambus® DRAM (RDRAM), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS™) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translations may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if the required translation is not resident in any of the configured page tables (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

TLB Unit within a Core

As mentioned above, in one embodiment, each of the cores 100 may be multithreaded. That is, each core 100 may include multiple strands, where each strand comprises the hardware that supports one thread. For example, in the embodiment of FIG. 2 as described above, a strand may include the hardware within the IFU 200 to fetch instructions for the corresponding thread and store the instructions for issue by the pick unit 206. A strand may share the instruction cache 204 with all other strands, and may share the decode unit 208 and the EXU 210a or 210b with other strands in the same thread group. A strand may share the LSU 230 (including data cache 235), the FPU 220, and the SPU 240 with all other strands. The amount of hardware sharing between strands may vary from embodiment to embodiment.

In a given core, two or more strands share a TLB unit (or TLB units) such as TLB unit 400 described below in conjunction with FIG. 5. In one embodiment shown in FIG. 4, all of the strands in a core share an ITLB unit and a DTLB unit. In other embodiments, there may be more than one TLB unit (or more than one ITLB unit and more than one DTLB unit) in a core and subsets of strands may share a TLB unit. For example, the strands that form a given thread group may share TLB units. Any amount of sharing may be implemented in various embodiments. In some embodiments, a TLB unit may be implemented as an ITLB, a DTLB, or both.

Figure 4:
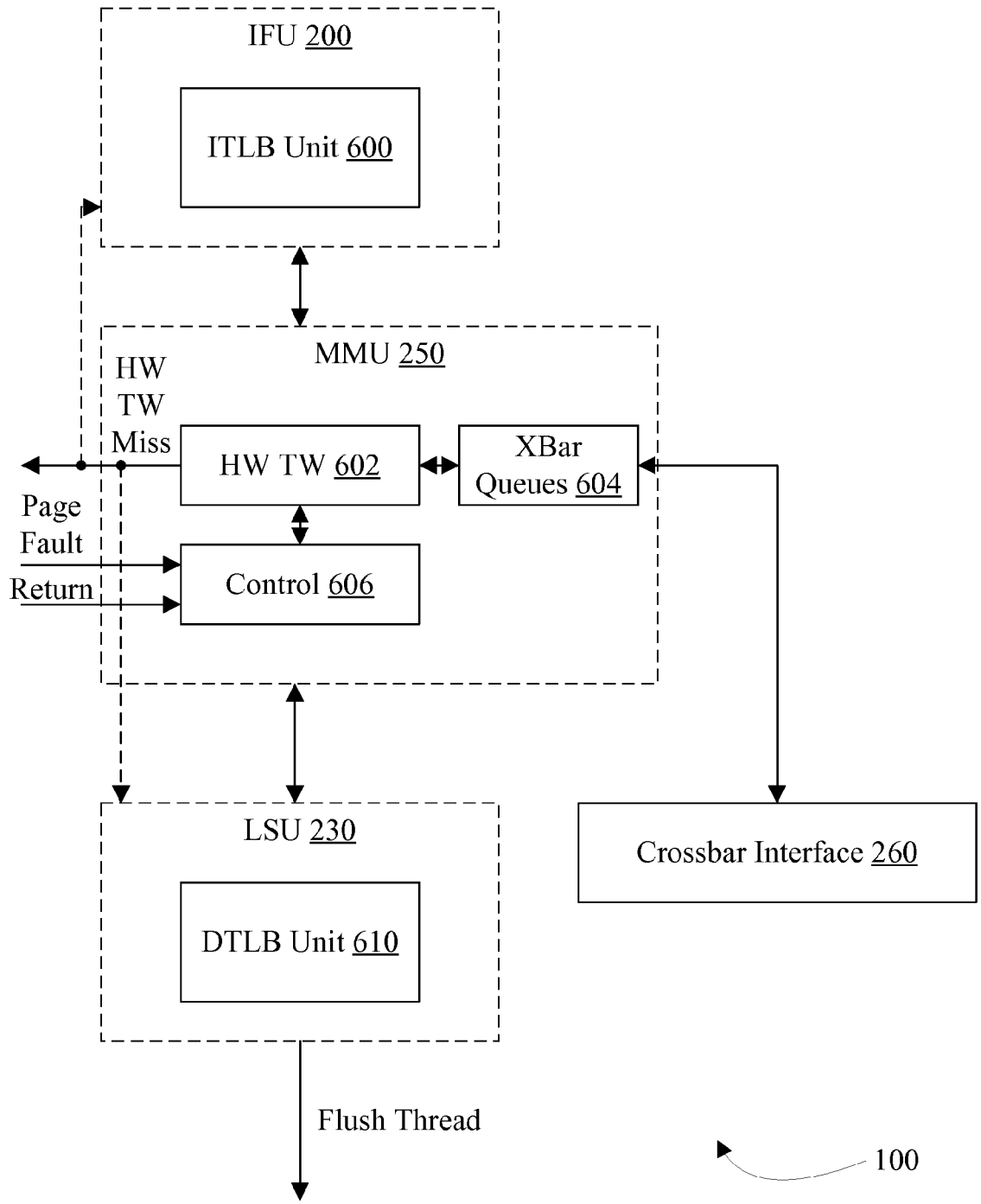
FIG. 4 is a block diagram of a portion of one embodiment of a core shown in greater detail.

Turning now to FIG. 4, a portion of the core 100 shown in FIG. 2 for one embodiment is shown in more detail. Cores 100a-100h may be instances of the core 100, for example. Particularly, the IFU 200, the MMU 250, the LSU 230, and the crossbar interface 260 are shown. The IFU 200 and the LSU 230 are coupled to the MMU 250, which is further coupled to the crossbar interface 260. The LSU 230 and the IFU 200 may also be coupled to the crossbar interface 260 (e.g. see FIG. 2). In the illustrated embodiment, the IFU 200 includes an ITLB Unit 600. The MMU 250 includes a hardware table walk unit (HW TW) 602, one or more crossbar queues 604 coupled to the hardware table walk unit 602, and a control unit 606 coupled to the hardware table walk unit 602. The crossbar queues 604 are coupled to the crossbar interface 260. The LSU 230 includes a DTLB unit 610. The LSU 230 is also configured to issue a flush thread indication ("flush thread" in FIG. 4). The control unit 606 may be coupled to receive a page fault signal and a return signal.

If the ITLB unit 600 detects a miss for a translation request (for a fetch in the instruction cache 204), the IFU 200 may transmit a TLB reload request to the MMU 250. The MMU 250 may initiate a table walk in the hardware table walk unit 602 responsive to the request. The hardware table walk unit 602 may be programmed with the base address of the page tables, and may be designed to search the page tables for a translation according to the definition of the page tables and the defined algorithm for accessing them for a given virtual address in the virtual memory system. For example, a portion of the virtual address may be used, sometimes in combination with a predefined hash function, as an index into the page tables. If the hardware table walk unit 602 successfully locates a translation in the page tables, the MMU 250 may return the translation for storage in the ITLB unit 600. If no translation is found, the MMU 250 (and more particularly the hardware table walk unit 602) may signal a hardware table walk miss (HW TW miss signal in FIG. 4). The MMU 250 may signal the HW TW miss directly to the TLU 270 for handling. Alternatively, the MMU 250 may signal the HW TW miss to the IFU 200 (dotted line in FIG. 4). If an instruction is to issue from the virtual page for which no translation was located, a page fault may be signaled at that point.

Similarly, if the DTLB unit 610 detects a miss for a translation request (for a load or store data access in the data cache 235), the LSU 230 transmits a TLB reload request to the MMU 250. The MMU 250 may either return a translation for storage in the DTLB unit 610 (successful table walk) or signal a HW TW miss (unsuccessful table walk). The MMU 250 may signal the HW TW miss directly to the TLU 270, or to the LSU 230 (dotted line in FIG. 4), which may associate the HW TW miss with the correct load/store instruction.

The hardware table walk unit 602 may generate requests to the crossbar interface 260 to read page table entries from the L2 cache 120 and/or memory (and optionally to write page table entries, such as to update a reference bit and/or change bit that may be used by software to determine which entries have been accessed/updated). The crossbar queues 604 may be used to store requests and corresponding data returned from the crossbar interface 260. In some embodiments, the requests may be passed through the data cache 235 first, if page table entries are cacheable in the data cache 235, before being transmitted to the crossbar queues 604.

Mapping Values to an Identifier to Improve TLB Performance

The access time of a TLB is often a critical determinant of processor cycle time. When a TLB is used to look up a translation for a given virtual address, a significant portion of the TLB's access time is spent comparing a virtual address to the tags of various translations stored in the entries of the TLB. To reduce this comparison time, in one embodiment, a TLB unit reduces size of the comparison (i.e., reduces the number of bits that are compared).

Figure 5:
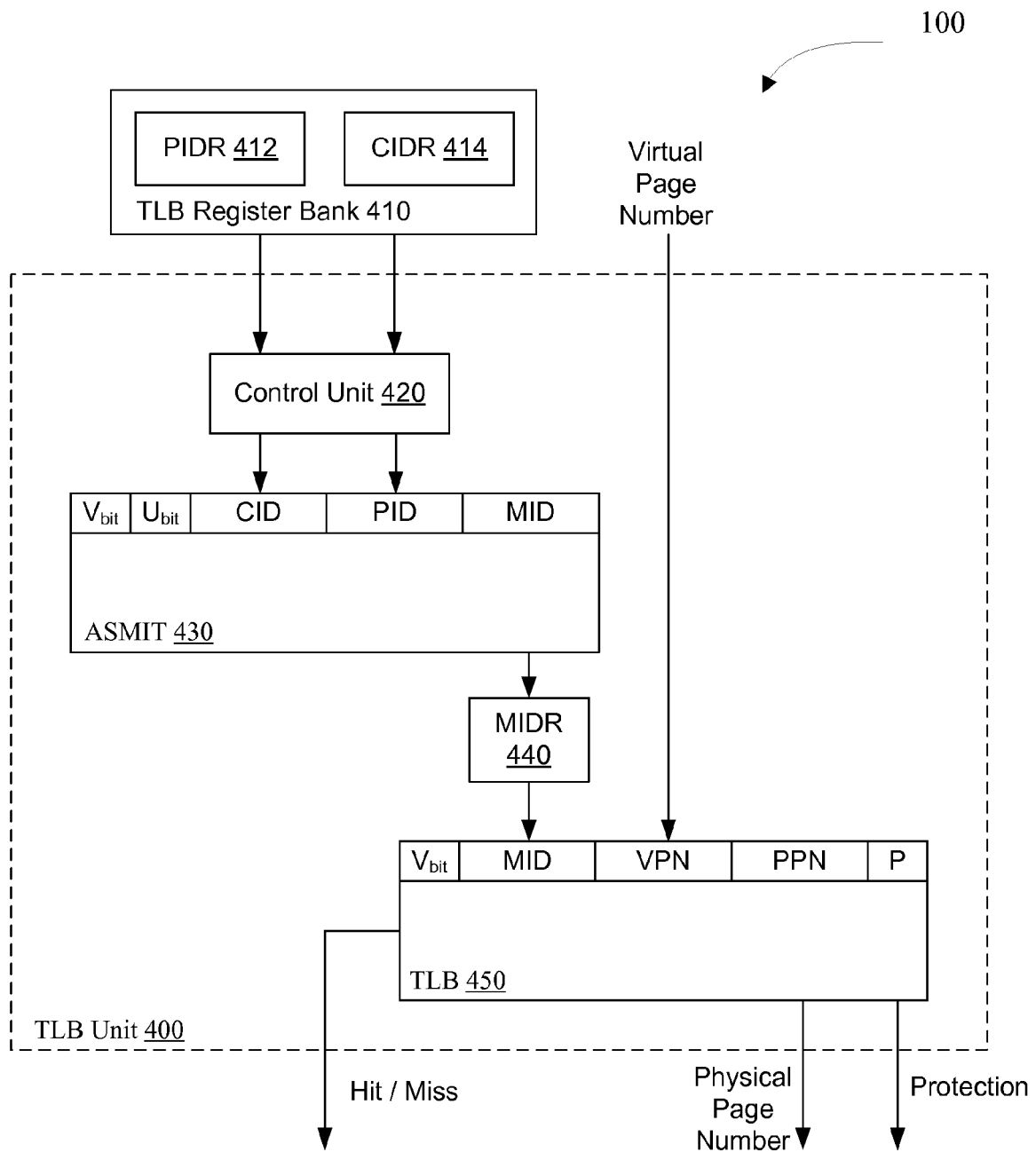
FIG. 5 is a block diagram of one embodiment of a TLB unit.

One implementation for reducing the number of compared bits is depicted in FIG. 5, where a block diagram for a TLB unit 400 is shown. TLB unit 400 reduces the number of compared bits though mapping one or more values that identify a virtual address space to a smaller identifier value, which then is provided to TLB 450. This smaller identifier is then used to detect a hit/miss in TLB 450 instead of using the larger one or more values, and thus, a smaller comparison is performed. This solution is effective because it supports storing translations for multiple virtual address spaces (e.g. for multiple threads) without the slower comparison of a larger tag that would be used if the original values were stored in the TLB 450 and compared.

TLB unit 400 includes a control unit 420, an address space ID map table (ASIMT) 430, a micro-address space ID register (MIDR) 440, and a TLB 450. Control unit 420 is coupled to an external TLB register bank 410, and ASMIT 430. MIDR 440 is coupled to ASMIT 430 and TLB 450. In the depicted embodiment, TLB 450 may receive a virtual address and provide an indication of a hit or miss, a physical address, and one or more protection bits. While control unit 420, ASMIT 430, and MIDR 440 are shown as being inside of TLB unit 400, they may be located elsewhere within core 100 or processor 10 in other embodiments. Similarly, while TLB Register bank 410 is shown as being external to TLB unit 400, TLB register bank 410 may be contained within TLB unit 400, in various embodiments. Additionally, there may be multiple TLBs 450.

In general, ASMIT 430 is a table that associates one or more larger values to a smaller identifier that is usable by TLB 450 to translate a virtual address. In the depicted embodiment, each mapping entry may contains a valid bit ($V_{bit}$), a used bit ($U_{bit}$), a context ID (CID), a partition ID (PID), and a micro-address space ID (MID). In other embodiments, each entry may contain additional information, as desired.

In ASMIT 430, the valid bit indicates whether an entry has a correct, updated mapping. For example, when processor 10 is first powered on, no values from memory have been loaded, and thus all the mappings stored in ASMIT 430 are invalid. To indicate this, the valid bit may be reset for each entry in the ASMIT 430. Accordingly, when a mapping is loaded into an entry of ASMIT 430, the valid bit for the mapping may be set.

The used bit indicates whether an entry's mapping has been used recently. That is, the used bit of an entry is set when a mapping is first loaded into ASMIT 430 and when the mapping is hit and used in a translation. Additionally, whenever all used bits are all set, TLB 450 automatically resets all used bits. In this way, the used bits reflect which entries have been recently used (since the last used bit clear) and which have not been recently used.

In one embodiment, a used bit algorithm may be employed to determine what entry to replace. For example, when a new mapping is being loaded into ASMIT 430, any invalid entries may be selected to the store the new mapping. If no invalid entries are available, an unused entry may be alternatively selected. In various embodiments, the used bits are reset periodically when all entries become used. As mappings are allocated or used in translations, their respective used bits are set. Alternatively, used bits of entries that are not used recently remain cleared, and thus these unused entries may then be selected to store a new mapping. It is noted that in various embodiments other algorithms may be employed for the selection of an entry.

The CID and PID represent two possible fields that may identify a virtual address space and that may be mapped to a smaller identifier such as the MID described below. The CID may be used by the MMU to distinguish between the virtual address spaces of different executing processes. The CID may also be used to allow the sharing of virtual address spaces between processes or to separate the address spaces, depending upon software requirements. That is, the CID may be the same for processes that share a virtual address space, but different for processes that do not share a virtual address space. In virtualized systems with multiple domains controlled by a hypervisor, a PID may be used by the MMU to distinguish virtual address spaces in one domain from virtual address spaces in other domains. In one embodiment, the PID may be 16 bits and the CID may be 32 bits, while the MID may be only 7 bits. It is noted that in other embodiments, other values besides the CID and PID may also be included in a mapping to a smaller identifier.

The MID is an identifier value that may be provided to the TLB 450 to detect a hit/miss. In one embodiment, the MID may be smaller (i.e., contain less bits) than values that map to it (e.g., the CID, the PID, or other values identifying the virtual address space). In some embodiments, the MID may include enough bits to represent a different CID/PID pair in every entry in TLB 450. In other embodiments, the MID may contain enough bits to represent each thread or process executing on a processor.

It is noted that in some embodiments, the MID may not be physically stored in ASMIT 430, as the MID may correspond to a location of an entry storing a mapping within AMSIT 430. For example, if the CID and PID hit in an entry of ASMIT 430, the entry number may be provided as the MID.

ASMIT 430 can be implemented using any form of memory. In one embodiment, ASMIT 430 may be implemented using a content-addressable memory (CAM), where the key field is a concatenation of the larger values (e.g., PID and CID) and the data field is the smaller identifier (e.g., MID). In some embodiments, ASMIT 430 may be a fully associative memory. In other embodiments, ASMIT 430 may be a set-associative memory. In various embodiments, ASMIT 430 may be implemented using other types of memory such as random access memory (RAM).

TLB register bank 410 includes one or more values that provide information about an executing thread and are usable by the TLB unit 400 to perform a translation. In one embodiment, the register bank 410 may contain a partition ID register (PIDR) 412, which stores a PID. In another embodiment, the register bank may contain a context ID register (CIDR) 414, which stores a CID. In some embodiments, one or more of the registers in register bank 410 may be software-accessible, where software is able to write values to the one or more registers. It is noted that in various embodiments, TLB register bank may contain additional registers that store respective values corresponding to other attributes of executing threads or processes, as desired.

Control unit 420 is an integrated circuit that continually monitors values in TLB register bank 410 to detect whether one or more of the values have changed. If any of the values change, control unit 420 checks ASMIT 430 to determine whether the values (e.g., CID and PID) are present in a mapping stored in ASMIT 430. If the values hit in ASMIT 430, control unit 420 may provide the corresponding MID to the micro-address ID register (MIDR) 440, coupled to TLB 450. On the other hand, if the values miss in ASMIT 430, control unit 420 may determine a new mapping of the values to a corresponding MID and store the mapping in an invalid or unused entry within ASMIT 430. One embodiment of a method for detecting a change and performing a mapping is described in greater detail below in conjunction with FIG. 6.

TLB 450 provides a mapping of an MID and a virtual address to a physical address. In one embodiment, TLB 450 may be a fully associative memory. In another embodiment, TLB 450 may be a set-associative memory. As shown in the depicted embodiment, each TLB entry contains a valid bit, an MID, a virtual page number (VPN), a physical page number (PPN), and one or more protection bits (P). To perform a translation, TLB 450 receives an MID from MIDR 440 and a virtual page number. If the MID and the VPN hit in TLB 450, the physical address, the protection bits, and an indication of a hit may be provided. On the other hand, if the MID and the VPN miss in TLB 450, a miss is signaled (e.g., to the MMU 250 shown in FIG. 4) and the corresponding translation (i.e., a mapping of the MID and VPN to a PPN) may be loaded into TLB 450 if the table walk is successful. In this fashion, the translations that correspond to the virtual address space identified by a given CID/PID pair may be associated with the correct MID in the TLB 450.

Figure 6:
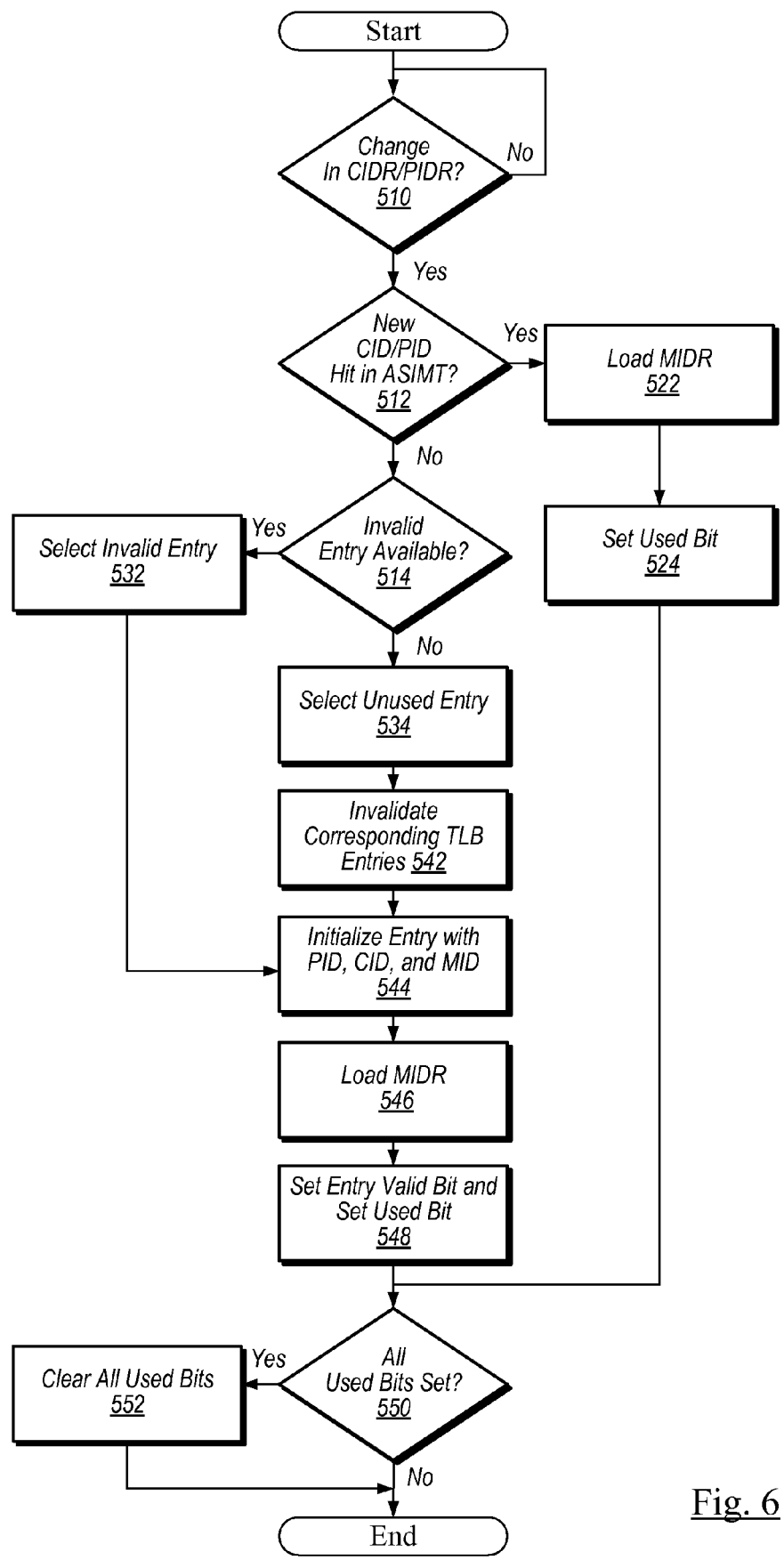
FIG. 6 is a flowchart illustrating operation of one embodiment of a control unit mapping values to an identifier.

Turning now to FIG. 6, a flowchart is shown illustrating the operations of one embodiment of the control unit 420 during the translation of a virtual address to a physical address by TLB unit 400. While the steps are shown in a particular order in FIG. 6 for ease of understanding, steps may be performed in parallel or in various other combinations in control unit 420. For example, steps 544, 546, and 548 may be performed together. While the operations are described using a CID and PID, in other embodiments, other values may be used. It is noted that steps, combinations of steps, and/or the flowchart as a whole may be pipelined over multiple clock cycles.

As explained above, a virtual address space may be identified by one or more larger values stored in register bank 410 (e.g., a PID and a CID). In step 510, control unit 420 may continually monitor the PIDR and CIDR in register bank 410 to detect whether or not these values have changed. Once control unit 420 detects such a change, control unit 420 may provide a new, corresponding identifier to TLB 450. To accomplish this, control unit 420, in step 512, may determine whether the new PID and CID hit in the ASIMT 430. If the values hit and a corresponding mapping is stored in ASMIT 430, control unit 420 may load the MID into MIDR 440, in step 522, and indicate that the mapping has been used by setting the used bit of the entry that hit, in step 524.

In step 512, if the PID and CID miss in ASIMT 430, control unit 420 may generate and store a new mapping in an entry of ASMIT 430. To determine an available entry for storage, control unit 420, in step 514, may check the valid bits of each entry to determine whether any invalid entries are available. If an invalid entry is available, control unit 420 selects the entry, in step 532, and loads the new mapping in the entry in step 544. As illustrated, the control unit 420 loads the MID into the MIDR, in step 546, and sets the valid and used bits in the entry, in step 548. On the other hand, if an invalid entry is not available, control unit 420 may select an unused entry, in step 534.

As describe above, an unused ASIMT entry may be selected by checking the used bits of each entry. Once an unused ASIMT entry is selected for storage, control unit 420 invalidates the mapping in ASIMT 430 and the corresponding translations in TLB 450. In step 542, control unit 420, in one embodiment, may invalidate every TLB entry that has a corresponding MID for the previously used ASMIT entry. In another embodiment, control unit 420 may invalidate all entries of TLB 450 to invalidate the previously used ASIMT entry's translations.

In step 544, the selected entry is initialized with a new mapping of a PID and a CID to an MID. In some embodiments as described above, the MID may correspond to the entry number. Then, in step 546, the MID is loaded into the MIDR and, in step 548, the corresponding valid bit is set and the used bit is set. Now the new mapping is ready for use.

The above discussion presumes that there is at least one unused entry available for selection. However, as more entries are hit and used, the number of available unused entries decreases until eventually no unused entries are free. In order to ensure that an unused entry is available, a used bit algorithm, such as the one describe above, may be used to select a less recently used entry. In such an algorithm, all used bits are checked, in step 550, and if each of the used bits is set, they are subsequently cleared in step 552. This clearing of bits guarantees that an unused entry is always available for selection in step 534. It is noted that, in other embodiments, other techniques may be used to clear unused bits or select an entry to be replaced, and that while steps 550 and 552 are shown at the bottom of the flowchart of FIG. 6, these steps may be independent of other operations in the flowchart and may be performed in parallel.

Numerous variations and modifications will become apparent to those skilled in the art once the above disclosure is fully appreciated. It is intended that the following claims be interpreted to embrace all such variations and modifications.

What is claimed is:

1. A system, comprising:
   one or more registers configured to store a plurality of values that identify a virtual address space;
   a translation lookaside buffer (TLB);
   a control unit coupled to the TLB and the one or more registers, wherein the control unit is configured to:
     detect whether or not the values have changed; and
     in response to a change in the values, map the changed values to an identifier having fewer bits than the total number of bits in the changed values, and provide the identifier to the TLB, wherein the TLB is configured to detect a hit/miss in response to the identifier.

2. The system of claim 1, further comprising a memory associating different ones of the changed values to identifiers, and wherein the control unit is further configured to determining whether the changed values are present in the memory.

3. The system of claim 2, wherein, if the changed values are not present, the control unit is further configured to associate, in the memory, the changed values to the identifier and select the identifier to provide to the TLB.

4. The system of claim 3, wherein the control unit is further configured to invalidate TLB entries that store the identifier to which the changed values are being associated.

5. The system of claim 4, wherein the control unit is configured to invalidate all the TLB entries.

6. The system of claim 1, wherein a hit in the TLB occurs if the identifier matches a stored identifier in a TLB entry and a virtual page number of a translation request matches a stored virtual page number in the TLB entry, and wherein, in response to a miss, a new translation is loaded into the TLB that includes the identifier.

7. The system of claim 1, wherein the values include a partition identifier.

8. The system of claim 1, wherein the values include a context identifier.

9. The system of claim 1, wherein the identifier includes at least enough bits to represent each process executing on a processor.

10. The system of claim 1, wherein the identifier includes at least enough bits to represent each entry in the TLB.

11. The system of claim 2, wherein the memory is content-addressable memory and a hit in a given entry results in an identifier equal to the entry number.

12. A method, comprising:
    storing, in one or more registers, a plurality of values that identify a virtual address space;
    detecting whether or not the values have changed; and
    in response to a change in the values, mapping the changed values to an identifier having fewer bits than the total number of bits in the changed values, and
    providing the current identifier to a TLB, wherein the TLB is configured to detect a hit/miss in response to the identifier.

13. The method of claim 12, further comprising:
    associating in a memory different ones of the changed values to identifiers; and
    determining whether the changed values are present in the memory.

14. The method of claim 13, further comprising:
    if the changed values are not present, associating, in the memory, the changed values to the identifier; and
    selecting the identifier to provide to the TLB.

15. The method of claim 12, wherein a hit in the TLB occurs if the identifier matches a stored identifier in a TLB entry and a virtual page number of a translation request matches a stored virtual page number in the TLB entry, and wherein, in response to a miss, a new translation is loaded into the TLB that includes the identifier.

16. The method of claim 12, wherein the values include a partition identifier.

17. The method of claim 12, wherein the values include a context identifier.

18. The system of claim 13, wherein the memory is content-addressable memory and a hit in a given entry results in an identifier equal to the entry number.

19. A processor comprising:
    one or more registers configured to store a plurality of values that identify a virtual address space; and
    a translation lookaside buffer (TLB) unit that is coupled to the one or more registers and is configured to:
        detect whether or not the values have changed; and
        map the changed values to a current identifier having fewer bits than a total number of bits in the changed values, and wherein the TLB unit comprises a TLB that is configured to map the current identifier and a virtual address input to a corresponding physical address.

20. The processor of claim 19, wherein the TLB unit comprises a memory associating different ones of the values to identifiers, and wherein the TLB unit is further configured to determining whether the changed values are present in the memory.

* * * * *